(12) United States Patent
McAllister

(10) Patent No.: US 6,722,684 B1
(45) Date of Patent: Apr. 20, 2004

(54) TRAILER HITCH AND ASSOCIATED METHODS

(76) Inventor: Kevin L. McAllister, 295 W. 1450 North, American Fork, UT (US) 84003

( * ) Notice: Subject to any disclaimer, the term of this patent is extended or adjusted under 35 U.S.C. 154(b) by 0 days.

(21) Appl. No.: 10/144,102

(22) Filed: Apr. 9, 2002

Related U.S. Application Data

(60) Provisional application No. 60/282,583, filed on Apr. 9, 2001.

(51) Int. Cl.⁷ .................................................. B60D 1/06
(52) U.S. Cl. ...................................... 280/483; 280/511
(58) Field of Search ............................... 280/483, 488, 280/511, 416.1

(56) References Cited

U.S. PATENT DOCUMENTS

| | | | | |
|---|---|---|---|---|
| 2,500,686 A | * | 3/1950 | Jontz ........................ 280/476.1 |
| 4,522,421 A | * | 6/1985 | Vance ........................... 280/511 |
| 4,627,633 A | * | 12/1986 | Gehman et al. ............. 280/432 |
| 5,040,817 A | * | 8/1991 | Dunn .......................... 280/511 |
| 5,116,072 A | * | 5/1992 | Swenson ..................... 280/511 |
| 5,290,057 A | * | 3/1994 | Pellerito ...................... 280/507 |
| 6,053,521 A | * | 4/2000 | Schertler ..................... 280/511 |
| 6,270,107 B1 | * | 8/2001 | Stoughton ................... 280/507 |
| 6,494,478 B1 | * | 12/2002 | MacKarvich ............... 280/489 |
| 2001/0045725 A1 | * | 11/2001 | McCoy et al. .............. 280/511 |
| 2002/0140207 A1 | * | 10/2002 | McCoy et al. .............. 280/511 |

* cited by examiner

*Primary Examiner*—Kevin Hurley
(74) *Attorney, Agent, or Firm*—Thorpe, North & Western, LLP

(57) ABSTRACT

A trailer hitch that is capable of measuring or sensing the weight of trailer coupled thereto, or "tongue weight" is disclosed and described. In one aspect, the trailer hitch may include a ball slidably coupled to a post member and fastened thereto with a fastener that also acts as a weight indicator. In another aspect, the weight indicator may be provided as a separate mechanical output. Further, a trailer hitch which allows at least 365° rotation of a ball about a post member to which the ball is coupled is disclosed and described.

15 Claims, 3 Drawing Sheets

TRAILER HITCH AND ASSOCIATED METHODS

PRIORITY DATA

This application claims priority to U.S. Provisional Patent Application Ser. No. 60/282,583, filed on Apr. 9, 2001, which is incorporated herein by reference.

FIELD OF THE INVENTION

The present invention relates to trailer hitch devices. More particularly, the present invention relates to trailer hitch devices which are capable of indicating the tongue weight, or vertical load of an attached trailer.

BACKGROUND OF THE INVENTION

Many types of systems and devices are known for coupling a trailer to a vehicle for the purpose of towing the trailer. One of the most common types of coupling systems used with light duty, or other non-industrial vehicles is the "ball hitch." Typical "ball hitches" have a generally spherical shaped ball with a threaded rod connected to the base of the ball. The threaded rod is configured to engage a draw bar mounted on the towing vehicle using a threaded receiver or ball hitch fitting. A trailer coupling member positioned at the front-most section of the trailer, or "tongue" of the trailer, engages the ball hitch in a loose friction fit, and is secured to the ball in preparation for towing.

Ball sizes and maximum load ratings are governed by industry standards. For example, a two (2) inch diameter ball typically has a maximum load rating of 5,000 pounds while a two and five sixteenths (2 5/16) diameter ball has a maximum load rating of 7,000 pounds. One of the factors included in a load rating is the static vertical force applied by the trailer to the ball hitch, which is known as "tongue weight". Additional forces considered by industry standards in providing load ratings include the lateral forces applied to the ball hitch. Such lateral forces are generally a function of various use conditions, such as speed, acceleration, and turning radius of the towing vehicle, as well as the grade or severity of the driving surface.

Tongue weight plays a large role in balancing and stabilizing a trailer when towed. To this end, manufacturers of vehicles used for towing trailers typically specify acceptable ranges of tongue weight. Too little tongue weight may lead to unstable conditions for the trailer and may result in separation of the trailer coupling member from the ball hitch. Too much tongue weight may reduce the stability of the towing vehicle and make it more difficult to control. In addition, excessive tongue weight contributes to accelerated wear on braking and drive systems. As such, being able to verify that tongue weight is within an acceptable range presents both economic and safety advantages.

A number of methods and designs have been proposed to measure or sense the tongue weight applied by a trailer to a ball hitch. Some of the proposed designs require a unique draw bar or receiver structures. Other designs utilize electronic components for sensing and displaying the amount of vertical force applied to the ball hitch. Unfortunately, such systems generally require modifications to standard hitch components that have been designed to meet established industry standards. Further, nearly all trailer and towing vehicle designs are configured with established industry load standards using standard hitch components. As such, unique towing configurations may be difficult to apply broadly to a variety of vehicles and must be configured with an individual vehicle type in mind in order to ensure compliance with industry standards.

Additionally, ball hitch designs that utilize electronic sensing and outputting equipment suffer from a number of disadvantages. First, the incorporation of electronic components into a ball hitch imposes a significant additional expense. Additionally, wiring must be run to the ball hitch and is exposed to the elements and an abusive environment during towing. Further, sensitive electronic components may become damaged during the process of attaching the coupler to the ball hitch which often involves forceful impacts.

As a result, a trailer hitch that is capable of indicating a trailer load, or "tongue weight," that is simple, reliable, durable, and works within established government standards continues to be sought.

SUMMARY OF THE INVENTION

Accordingly, the present invention provides a load weight indicating trailer hitch that includes a ball slidably coupled to a post member and having a fastener or other indicator configured to indicate a load weight, or at least the compliance thereof within a specified weight range for the ball. Further, the present invention provides a load weight indicating trailer hitch that includes a ball having an opening configured to receive a post member; a post member having a first end configured to engage the opening in the ball, a second end configured to couple the post to a draw bar, and a channel extending from the first end to the second end; at least one spring member disposed within the opening of the ball between the ball and the first end of the post member; and an elongated fastener slidably coupling the ball and the post member, being configured to indicate a load weight.

The present invention additionally encompasses a method for determining compliance of a load weight. In one aspect, such a method includes the steps of providing a weight indicating trailer hitch as disclosed herein, and visually or tactilely examining the positioning of the fastener or indicator.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Figure 1:
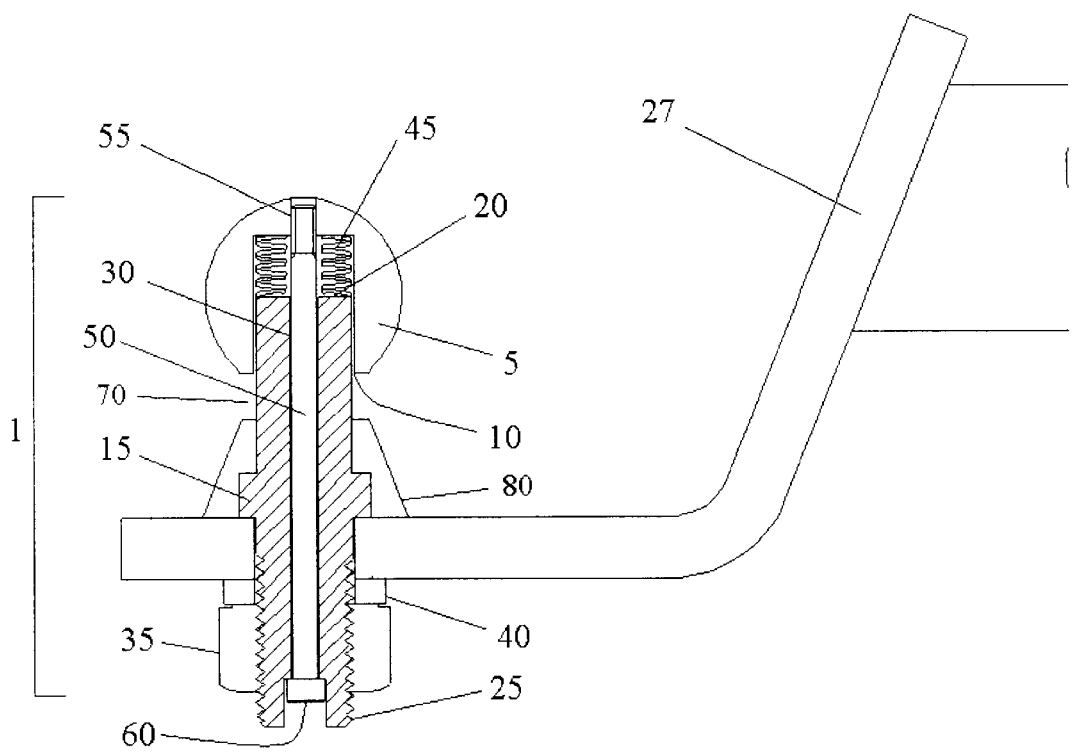
FIG. 1 is a cross sectional view of one embodiment of a weight indicating trailer ball hitch and draw bar in accordance with the present invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and, "the" include plural referents unless the context clearly dictates otherwise. Thus, for example, reference to "a weight indicator" includes one or more of such indicators, reference to "an output member" includes reference to one or more of such members, and reference to "the fastener" includes reference to one or more of such fasteners.

Definitions

In describing and claiming the present invention, the following terminology will be used in accordance with the definitions set forth below.

As used herein, "resistance" refers to a variable force that opposes the motion exerted by the weight of a trailer when coupled to a trailer hitch.

As used herein, "indicate" refers to the conveyance or transmission of information concerning the weight of a trailer. Furthermore, an "indicator" refers to a device or mechanism for conveying or transmitting such information.

As used herein, "mechanical output" refers to a mechanical indicator (i.e. one not utilizing electricity) that indicates in a readable manner, the weight of a trailer coupled to a trailer hitch, or at least the compliance or non-compliance thereof with the weight limits of the trailer hitch. As indicated below, the manner in which the output is read may take a variety of forms, such as visual inspection, tactile inspection, etc.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1–3, from 2–4, and from 3–5, etc.

This same principle applies to ranges reciting only one numerical value. Furthermore, such an interpretation should apply regardless of the breadth of the range or the characteristics being described.

The Invention

Before the present load weight indicating trailer hitch is disclosed and described, it is to be understood that the present invention is not limited to the particular structural elements and process steps disclosed herein, but is extended to equivalents thereof as would be recognized by those ordinarily skilled in the relevant arts. It should also be understood that terminology employed herein is used for the purpose of describing particular embodiments only and is not intended to be limiting.

Referring now to FIG. 1, is shown an embodiment of a weight indicating trailer hitch made in accordance with the present invention. The trailer hitch advantageously includes a readable or visible mechanical output that visually indicates at least compliance or noncompliance of the tongue weight of the trailer with the tongue weight requirement of the hitch, as described in greater detail below. The trailer hitch assembly 1, includes a ball 5 which may be of any industry standard conforming ball size. The ball has an opening 10 configured to receive a post member 15. The post member has a first end 20 configured to engage the opening, a second end 25 configured to couple the post to a draw bar 27, and a channel 30 extending from the first end to the second end.

Second end 25 may be any configuration sufficient to attach the post member 15 to a draw bar 27, or other structure meant for coupling a ball hitch to a towing vehicle. Such attachment may be either permanent or removable. Further, the second end may utilize supporting elements for attachment, such as nuts, washers, pins, clamps, etc. In one aspect, the second end may be threaded and utilize a nut 35 and washer 40 in order to effect attachment of the post member to the draw bar.

At least one resistance member 45 is disposed within the ball opening 10 and placed between the ball and the first end 20 of the post 15. The resistance member is configured to provide a vertical resistance equivalent to, or just less than, the vertical force applied by a specified load weight. By way of example without limitation, in one aspect, a resistance member, such as a spring, or plurality of springs, may be used which provide a vertical resistance equal to, or just less than, the vertical force applied by a load weight of about 500 lbs. In another aspect, the resistance member may provide a resistance equal to or just less than the vertical force applied by a load weight of about 1000 lbs. Those ordinarily skilled in the art will appreciate that in addition to the coiled springs shown, a wide variety of spring types may be used with the present invention. Further, it is to be understood that a wide variety of resistance members may be substituted for the at least one spring member, including but not limited to, compressed liquids, compressed gasses, deformable elastic solids such as rubber, etc.

Post 15 is slidably coupled to the ball 5, through the opening 10 using a fastener 50. The fastener has a ball attachment end 55 which is attached to the ball inside the opening, and is slidably inserted into the channel 30 of the post. The fastener terminates in post engaging end 60, which is configured to prevent separation of the ball from the post. The post engaging end optionally serves as a weight load indicator as will be more fully described below.

In one aspect, the fastener 50 may be integrally formed with the ball 5. In another aspect, the fastener may be attached to the ball after formation thereof. Additionally, the post engaging end 60 may take a variety of configurations sufficient to prevent separation of the ball and the post. For example, the post engaging end 60 can be enlarged to abut the second end 25 of the post 15 and to resist the spring 45 from forcing the ball 5 from the post 15. In one aspect, the channel 30 can have an enlarged opening or bore at the second end of the post 15 so that the enlarged post engaging end 60 is received within the enlarged opening or bore, and thus is disposed within the channel without protruding therefrom.

Figure 2:
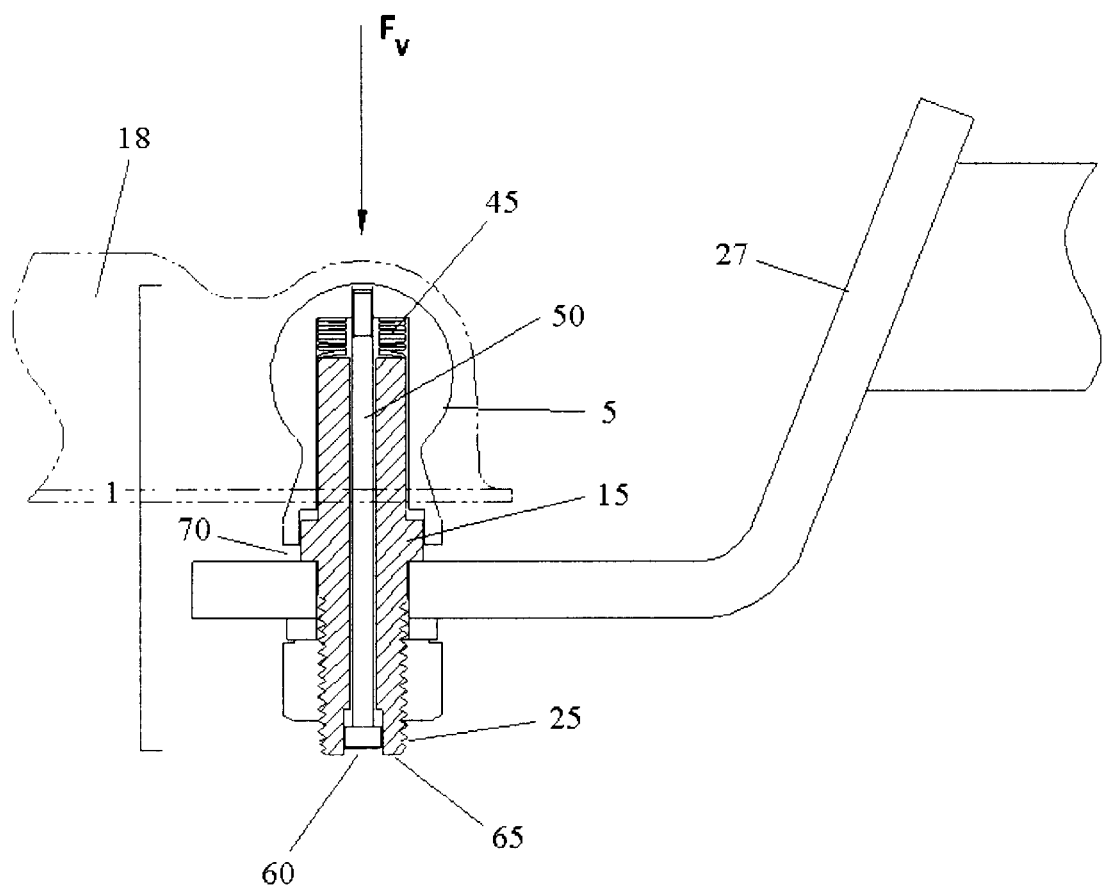
FIG. 2 is a cross sectional view of one embodiment of a weight indicating trailer ball hitch in accordance with the present invention, experiencing a vertical load within an acceptable range.

As shown in FIG. 1, the ball hitch assembly 1 has no weight load applied to it. As such, the at least one spring, or resistance member 45 provides sufficient tension between the ball 5 and the post 15, that the ball and the fastener 50 are held in a first position with respect to the post 15. As shown in FIG. 2, upon application of a vertical force $F_v$, applied by a coupling member 18 of a trailer, the ball and fastener move to a second position with respect to the post. Such movement is allowed by the compression of the one or more spring elements 45 under the weight load $F_v$.

Figure 3:
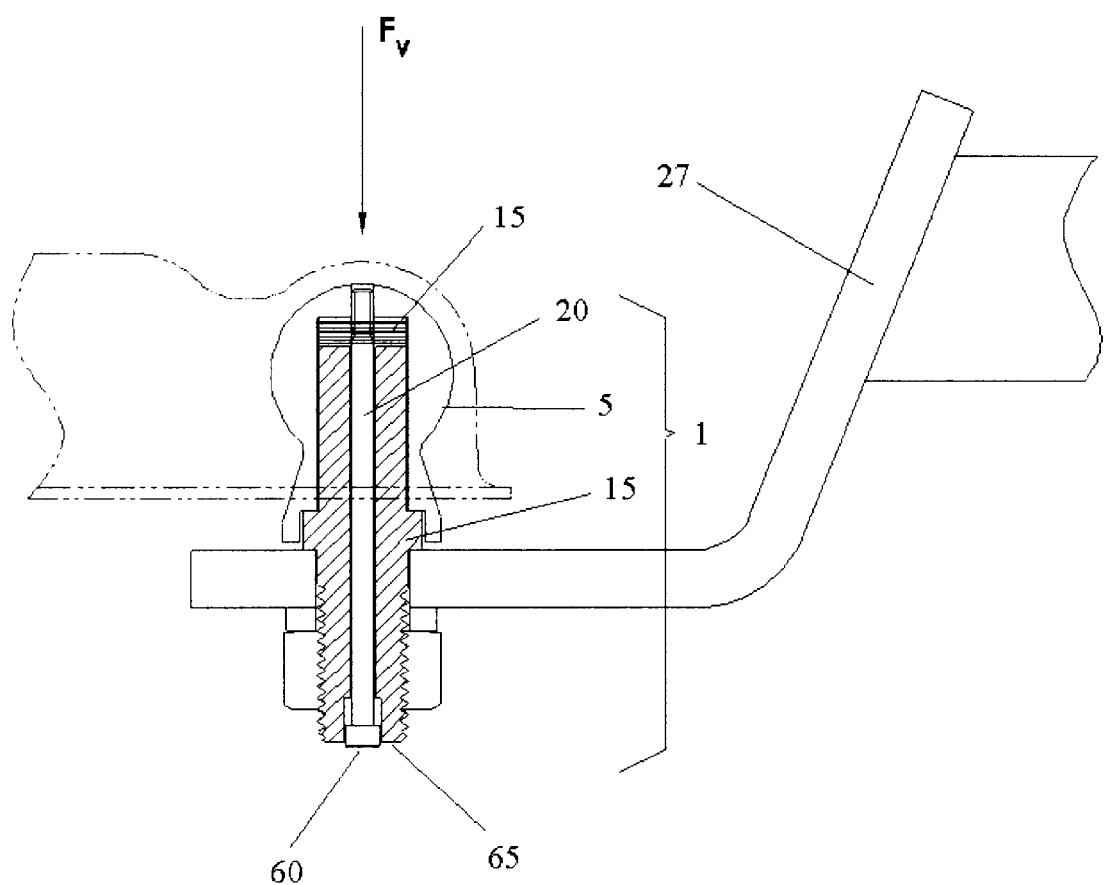
FIG. 3 is a cross sectional view of one embodiment of a weight indicating trailer ball hitch in accordance with the present invention, experiencing an excessive vertical load.

As depicted in FIG. 2, the post engaging end 60 may serve as an indicator of weight load compliance, and may form the readable or visible mechanical output. Which may be detected by visual or tactile inspection. Particularly, FIG. 2 shows a weight load which complies with the acceptable standards for the ball hitch assembly 1, as the post engaging end of the fastener does not protrude past the terminus 65 of the second end 25 of the post 15. By contrast, FIG. 3 depicts a non-compliant weight load, as indicated by the protrusion of the post engaging end of the fastener past the terminus of the second end of post. Thus, a user can determine compliance with the tongue weight requirements by visually or tactically inspecting the bottom of the ball hitch assembly. The post engaging end of the fastener can include visual enhancements, such as a bright color. In addition, the post engaging end of the fastener can include a hazard or caution color, such as red, to further indicate noncompliance.

In addition to the protrusion indicator embodiment show in the present drawings, alternative weight indicator mechanisms are included in the present invention. For example, the post engaging end 60 of the fastener 50 may be equipped with a scale of markings or colors which not only allow the indication of weight load compliance, but also measure the exact or approximate vertical force, or weight, being applied to the trailer hitch assembly 1. Those of ordinary skill in the art will readily recognize the scope and type of measuring indicators which may be derived using scaled markings, colors, etc., on the post engaging end of the fastener, as well as at any other place on the trailer hitch assembly.

Further, the weight load indicator of the present invention is not limited to the post engaging end 60 of the fastener 50, but may also include a variety of other indicators. Referring again to FIGS. 1 and 2, is shown a space 70 below the bottom of ball 5. Notably, in FIG. 1, the space is defined by the bottom of the ball and a neck 80. It is to be understood that the neck may be included as a separate piece, as part of the post member 15, or as shown in FIG. 2, the may be included as an integral part of the ball, and the space is defined by the bottom thereof and the top surface of the draw bar 27. Further, the neck may take a number of suitable shapes, and in some embodiments of the invention may be optionally excluded. The amount and presence of the space may be used as a weight load indicator as the ball and fastener move between a first position and a second position as described above.

It is to be understood that a variety of known ball configurations may be used in connection with the present invention, as shown with the differences between FIGS. 1 and 2. As such, the space indicator 70 may be a wide variety of sizes, and the post 15 may be scaled with markings or colors in a similar manner as the post engaging end 60 of the fastener 50, as described above, to indicate the exact or approximate amount of vertical force or weight which is applied to the trailer hitch assembly 1. Moreover, it is to be understood that the ball 5 may be coupled to the post member 15 in a variety of manners, which may eliminate the need for the fastener 50. For example, in one aspect, the post member may be formed with a lip or ring that is contained within the opening 10 of the ball, and prevents the removal of the ball from off of the first end 20 of the post. Additional configuration for holding the ball onto the end of the post will be recognized by those skilled in the art.

One additional advantage presented by the present invention is that the ball 5 is allowed to rotate with the motion of the trailer coupling member 18. Conventional ball hitches are designed so that the ball is either immovably fixed to the post member, or may be rotated to a certain degree. As such, it is possible for the post to become unscrewed and loosened from the draw bar during prolonged towing operations, due to the friction of the coupling member on the ball and the resultant forces on the post member. By contrast, the present ball is allowed to rotate freely for a full 365° or more around the post member 15. Therefore, the friction between the ball and the trailer coupling member is greatly reduced or nearly eliminated, and the safety concerns of the trailer becoming loosened or detached from the trailer hitch during use, are also reduced. At the very least, the need for frequent inspection and adjustment, or re-tightening of the hitch, is reduced or eliminated.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A weight indicating trailer hitch comprising:
   a ball having a resistance member disposed therein, slidably coupled to a post member, said post member being configured for attachment to a draw bar; and
   a visible mechanical output that visually indicates at least compliance or noncompliance of a weight of a trailer coupled to the ball with a weight requirement of the hitch.

2. The trailer hitch of claim 1, wherein the resistance member comprises a spring.

3. The trailer hitch of claim 1, wherein the post member further includes a channel extending longitudinally therethrough.

4. The trailer hitch of claim 3, further comprising a fastener slidably extending through the channel and coupling the ball to the post.

5. The trailer hitch of claim 1, wherein the post member acts as the visible mechanical output, and indicates the trailer weight as indicated by an amount of post exposed between the ball and the drawbar.

6. The trailer hitch of claim 5, wherein the fastener acts as the visible mechanical output, and the trailer weight is indicated by a presence or an absence of the fastener protruding out of the post member.

7. A weight indicating trailer hitch comprising:
   a ball having a opening;
   a post member having a first end configured to engage the opening in the ball, and a second end configured to couple the post member to a draw bar, and a channel extending through the post member from the first end to the second end;
   at least one resistance member disposed within the opening of the ball between an inside portion of the ball and the first end of the post member;
   an elongated fastener attached to an inside portion of the ball, and extending through the channel of the post member, slidably coupling the ball and the post member; and
   a readable mechanical output that indicates at least compliance or noncompliance of a weight of a trailer coupled to the ball with a weight requirement of the hitch.

8. The trailer hitch of claim 7, wherein the fastener acts as the readable mechanical output, and the compliance or noncompliance of the trailer weight is indicated by the presence or absence of the fastener protruding out of the second end of the post member.

9. The trailer hitch of claim 9, wherein the post member acts as readable mechanical output, and the compliance or noncompliance of the trailer weight is indicated by an amount of the post which is exposed between the ball and the drawbar.

10. The trailer hitch of claim 7, wherein the resistance member comprises a spring.

11. A trailer hitch comprising:

a post member having a first end configured for coupling to a ball, and a second end configured for coupling to a draw bar, said post member additionally including a channel extending longitudinally therethrough;

a fastener extending through the channel; and a ball rotatably coupled to the first end of the post member by the fastener in a manner that provides a 365° rotation of the ball about the post member.

12. The trailer hitch of claim 11, further comprising a resistance member disposed within the ball.

13. The trailer hitch of claim 12, wherein the resistance member comprises a spring.

14. The trailer hitch of claim 11, further comprising a visible mechanical output that visually indicates at least compliance or noncompliance of a weight of a trailer coupled to the ball with a weight requirement of the hitch.

15. The trailer hitch of claim 14, wherein the fastener acts as the readable mechanical output, and the compliance or noncompliance of the trailer weight is indicated by the presence or absence of the fastener protruding out of the second end of the post member.

* * * * *